US 6,604,618 B1

(12) United States Patent
Godshaw et al.

(10) Patent No.: US 6,604,618 B1
(45) Date of Patent: Aug. 12, 2003

(54) COMPUTER PROTECTION AND CARRYING CASE

(75) Inventors: Donald E. Godshaw, Evanston, IL (US); Andrezj Redzisz, Skokie, IL (US)

(73) Assignee: Travel Caddy, Inc., Des Plaines, IL (US)

( * ) Notice: Subject to any disclaimer, the term of this patent is extended or adjusted under 35 U.S.C. 154(b) by 0 days.

(21) Appl. No.: 09/887,806

(22) Filed: Jun. 22, 2001

Related U.S. Application Data
(60) Provisional application No. 60/213,298, filed on Jun. 22, 2000.

(51) Int. Cl.⁷ ................................................. A45C 7/00
(52) U.S. Cl. ...................... 190/107; 190/900; 190/1; 190/2; 206/305; 206/320
(58) Field of Search ................... 206/305, 360, 206/320; 190/1, 900, 107, 2; 383/4

(56) References Cited

U.S. PATENT DOCUMENTS

| | | | | |
|---|---|---|---|---|
| 1,755,548 A | * | 4/1930 | Lowe | |
| 3,081,807 A | * | 3/1963 | Lightburn | 206/320 |
| 5,377,794 A | * | 1/1995 | Book | 190/1 |
| 5,395,023 A | * | 3/1995 | Naymark et al. | 224/253 |
| 5,445,266 A | * | 8/1995 | Prete et al. | 206/320 |
| 5,607,054 A | * | 3/1997 | Hollingsworth | 206/320 |
| 5,797,529 A | * | 8/1998 | Lavine | 190/107 X |
| 5,887,723 A | * | 3/1999 | Myles et al. | 206/320 X |
| 6,296,094 B1 | * | 10/2001 | Knecht | 190/107 |

* cited by examiner

*Primary Examiner*—Tri M. Mai
(74) *Attorney, Agent, or Firm*—Banner & Witcoff, Ltd.

(57) ABSTRACT

A computer carrying case is formed from a single set of connected panels foldable around personal computers or other items having a variety of sizes of dimensions including semi-rigid front and back panels connected by oversized, flexible or living hinges and connecting flyer.

3 Claims, 4 Drawing Sheets

COMPUTER PROTECTION AND CARRYING CASE

CROSS REFERENCE TO RELATED APPLICATION

This is a utility application from Ser. No. 60/213,298 filed Jun. 22, 2001 entitled "Computer Carrying Case" upon which we claim priority.

BACKGROUND OF THE INVENTION

In a principal aspect the present invention relates to a padded case especially adapted for packing and/or carrying of a personal computer regardless of the size and configuration of the personal computer.

It is commonplace for individuals to transport their personal computer with them. Typically, the personal computer is placed in a briefcase or some type of large luggage item. In such circumstances, the computer may be subjected to unintended abuse and damage. Thus, there has developed a need to provide an improved personal computer case which is easily transportable, which may be incorporated with and used in combination with various types of luggage items and which accommodates personal computers regardless of their size and configuration.

SUMMARY OF THE INVENTION

Briefly, the present invention comprises a computer carrying case which is formed from a single padded planar set of connected panels that are foldable in a manner which accommodates personal computers or other items having a wide variety of size or dimensions. Specifically, semi-rigid front and back panels are connected by a living or flexible hinge. Side flaps on the front panel fit over the back panel to fold the panels tightly together and a top flap is provided along the top edge of the back panel to fit over the front panel to provide a full enclosure for the personal computer, or other item. Two versions of the carrying case are disclosed.

Thus, it is an object of the invention to provide an improved personal computer carrying case.

It is a further object of the invention to provide a personal computer carrying case which is formed from a series of planar padded panels that may be secured together by flexible padded living hinges.

Yet another object of the invention is to provide an economical, easy to use computer carrying case which may be used to carry and protect a personal computer or which may be inserted and maintained within a larger business case. These and other objects, advantages and features of the invention will be set forth in the detailed description which follows.

BRIEF DESCRIPTION OF THE DRAWING

In the detailed description which follows, reference will be made to the drawing comprised of the following figures.

DESCRIPTION OF THE PREFERRED EMBODIMENT

Figure 1:
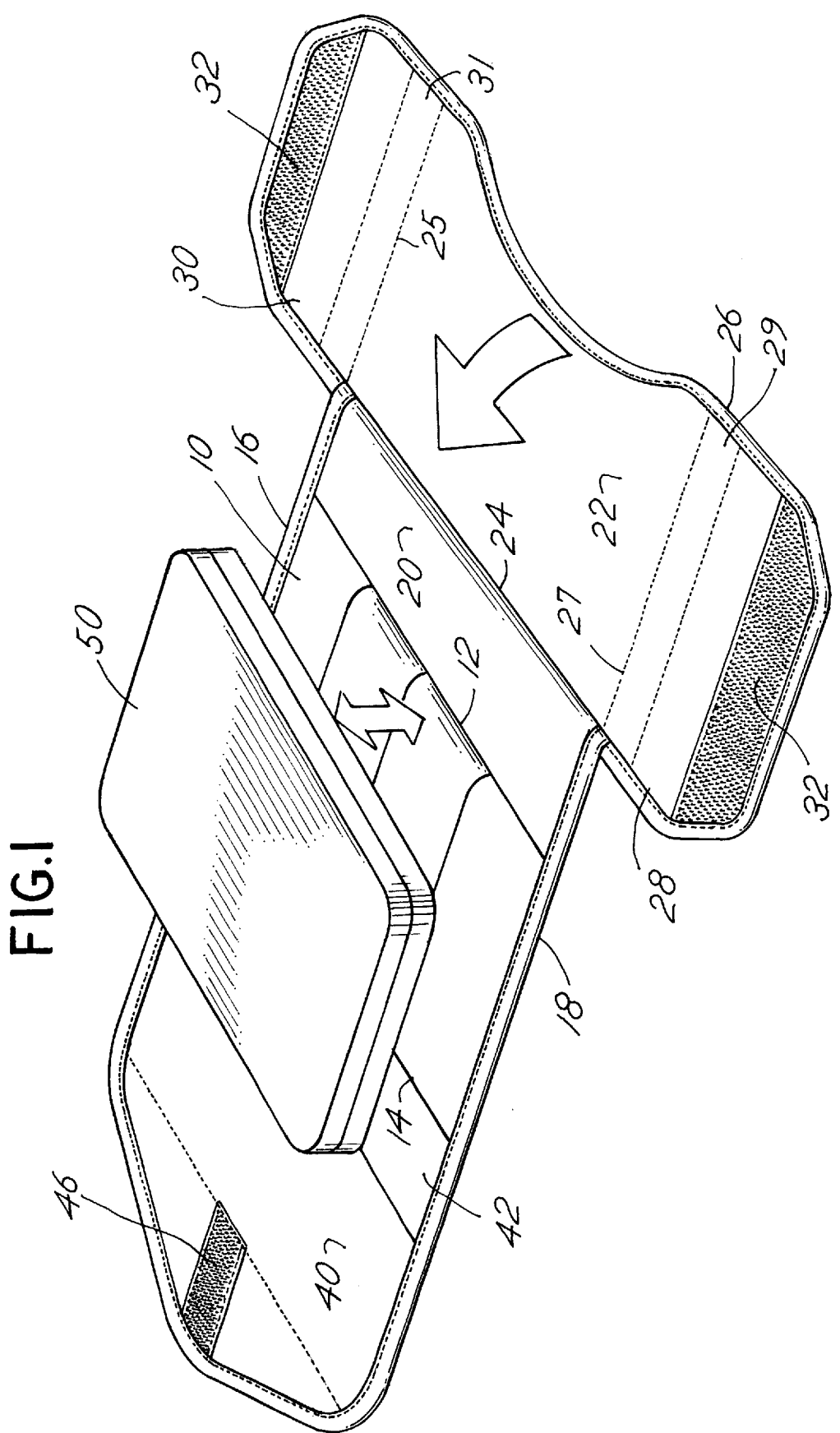
FIG. 1 is an isometric view of the computer carrying case or pouch wherein the pouch is in the unfolded condition with the interior thereof exposed.

Referring to the figures, the computer protection and carrying case comprises a single, flat planar element or sheet which includes a plurality or number of semi-rigid, internally padded side sections or panels connected together by flexible hinge sections. The case is thus a single integral series of panels connected together so that the sections may be folded about the hinge sections to create the case with a padded interior. The rigid sections or panels and flexible hinge sections are designed so that when the case is folded, the sections conform to the unique size and shape of a personal computer, for example, stored within the case. Thus, the single foldable pouch or case may be folded in a manner which accommodates the specific dimensions of a computer or similar item. The case may then be supported by a handle or strap to carry a computer, or placed within a larger case to protect the computer. This construction is described in greater detail below.

The pouch or case includes a generally internally or inside padded, at least semi-rigid, back side section 10. The back side section 10 includes a lower margin 12 and a top margin 14. The lower margin 12 and top margin 14 are parallel and spaced from one another to define two sides of the rectangular back side section 10. The back side section 10 further includes a first side margin 16 and a spaced, parallel, second side margin 18 to define the opposite and remaining sides of the rectangle defining the back side section 10.

Extending from the lower margin 12 as extensions of the side margins 16 and 18 is a bottom hinge section 20 which is comprised of a generally flexible material. The lower hinge section 20 has a bottom margin 24 connected to a generally rectangular front side panel 22. Bottom margin 24 is parallel to the lower margin 12 of back side section or panel 10. The front side section 22, further includes a top margin 26 which is generally parallel to the margin 12 of back panel 10 and margin 24 of section 20. The front section 22 fturther includes a first side flap 28 on one side thereof and a second side flap 30 on the opposite side thereof. The side flaps 28 and 30 extend outwardly in opposite directions from extension boundaries or lines 25, 27 defined respectively by extensions of the lines defined by the lateral side margins 16 and 18 respectively. A fastener material 32 is provided on the inside surface of the front side section 22. The fastener material 32 generally comprises a Velcro-type fastening material.

The front side section 22 top margin 26 has a convex shape to facilitate grasping an item in the folded case. Also, the front side section has a dimension or extent upward from the bottom margin 24 which is less than the dimension between margins 12, 14 of the back side section 10 also to facilitate access to the folded case contents.

Extending upwardly from the top margin 14 of the back section 10 and having spaced lateral sides as extensions of the lateral side margins 16 and 18 thereof is a flap 40. The flap 40 is connected to the back side section 10 by a flexible top hinge section 42. The flap 40 includes a strip of flat fastener material 46 on the inside surface thereof FIG. 1 depicts, with respect to all of the described sections, flaps, etc., the inside surface of the pouch or case.

Figure 2:
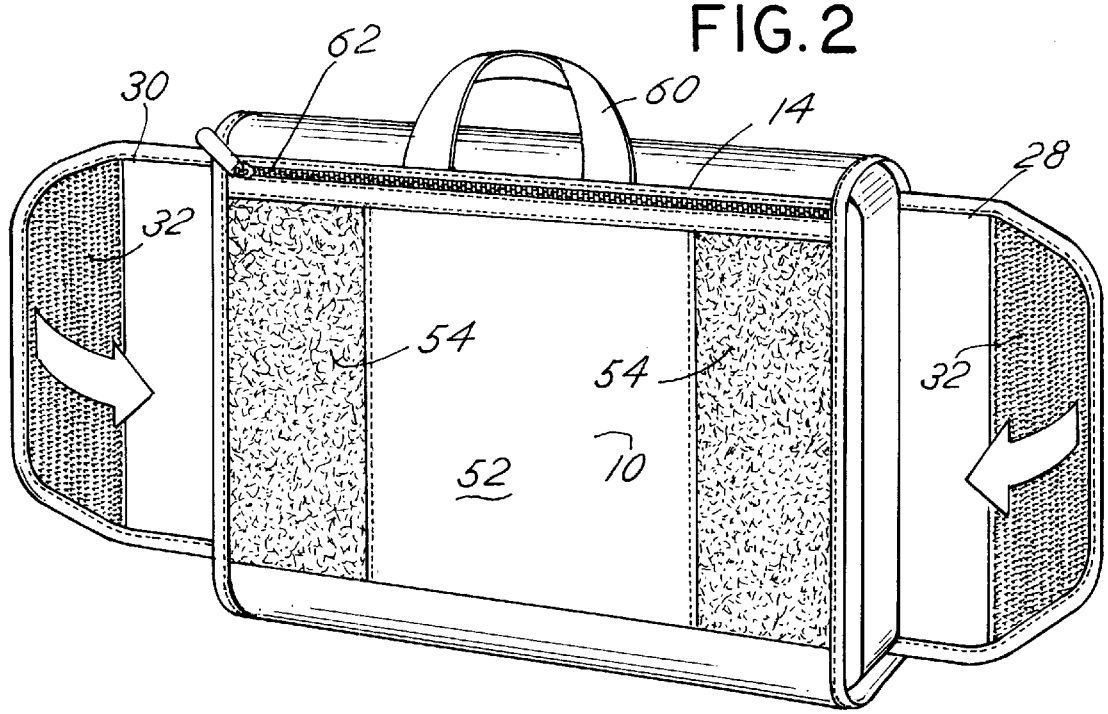
FIG. 2 is an isometric view of the case or pouch of FIG. 1 wherein the various sections thereof have been folded to define an enclosure or housing for a computer or similar item as viewed from the back side thereof.

In practice, a personal computer or other item 50 is positioned over the inside of the back side section 10. The front side section 22 is then folded over the computer 50 and the side flaps 28 and 30 are folded against the outside of the back side section 10 as depicted in FIG. 2. The outside 52 of the back side section 10 includes strips of fastener means 54 which cooperate with the fastener means 32 associated with the front side section 22. The flaps 28 and 30 include flexible or hinge sections 29 and 31, respectively, which enable folding over the sides of computer 50 by flaps 28, 30 and thereby tightly retain the computer 50. Because the hinge section 20 is also flexible, it accommodates only the thickness of the computer 50 when folded. The top hinge section 42 also is flexible and thus accommodates the thickness of the computer 50 and is adjustable to accommodate such thickness. The hinge sections (e.g. section 20, 28, 30) are also padded on the inside to protect the case contents. The fastening means such as the fasteners 32 and 54 are provided over a large face area of the various flaps and side sections to permit such accommodation of the thickness of various items, such as computer 50. Velcro fasteners are typical, though releasable adhesive and other types of fasteners may be used.

Figure 3:
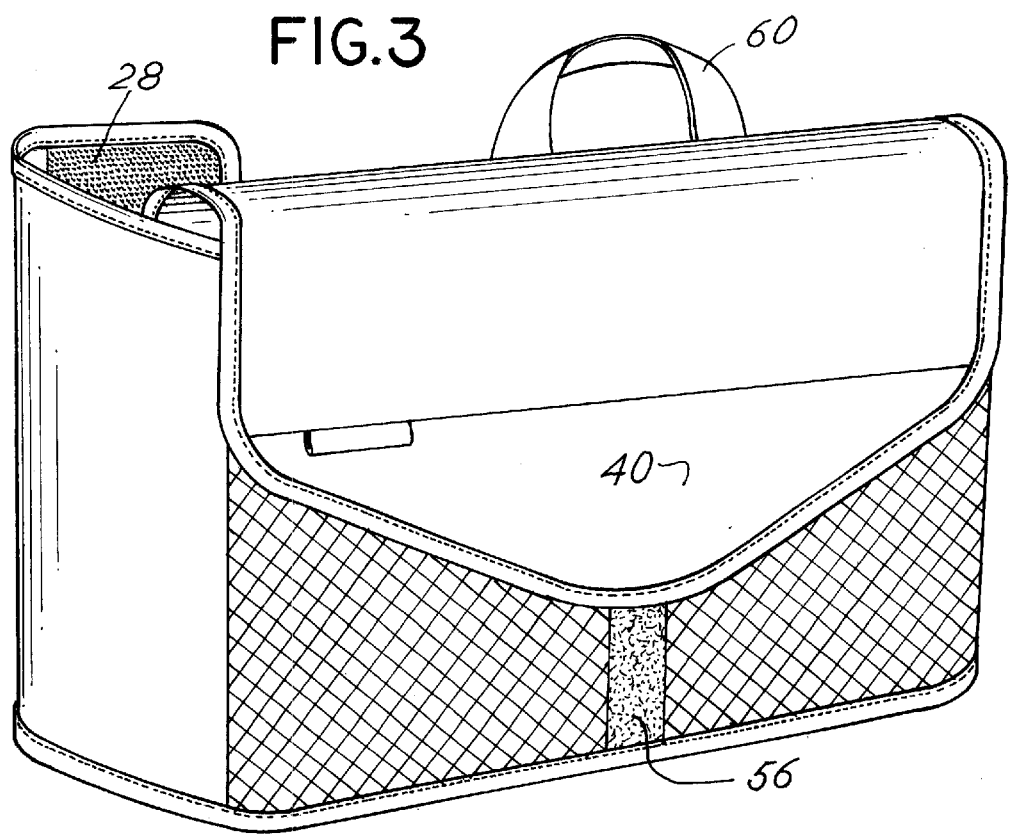
FIG. 3 is an isometric view of the pouch of FIG. 2 viewed from the front side thereof.

A handle 60 is attached to the outside of the back section 10 or to flap 40 at the juncture or margin 14 as depicted in FIG. 2. The flap 40 folds over the item within the pouch or case and the fastener material 46 cooperates with fastener material 56 on the outside of the back side 10 shown in FIG. 3 to hold the case shut and thereby entirely enfold a computer 50, for example, by a padded, protective covering.

Alternatively, a strap (not shown) may be attached to the case for carrying the case and its contents. Also, a zipper strip 62 may be incorporated adjacent handle 60 for zipper attachment within a larger case (not shown). Other fasteners may be used to retain the case within a larger case such as clips or Velcro type fasteners.

Figure 4:
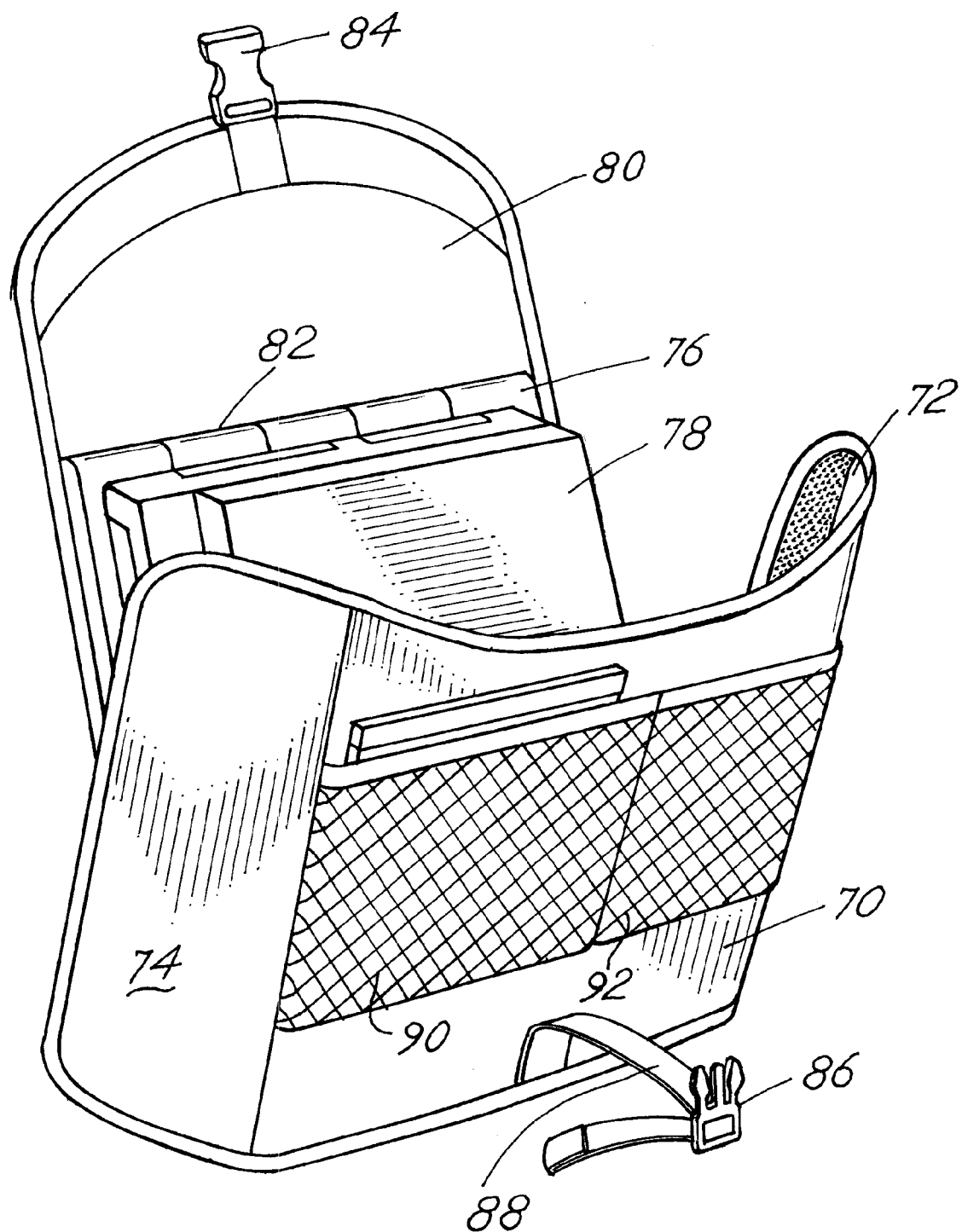
FIG. 4 is an isometric view of an alternative embodiment of the carrying case as viewed from the front side panel thereof with the carrying case partially assembled.
Figure 5:
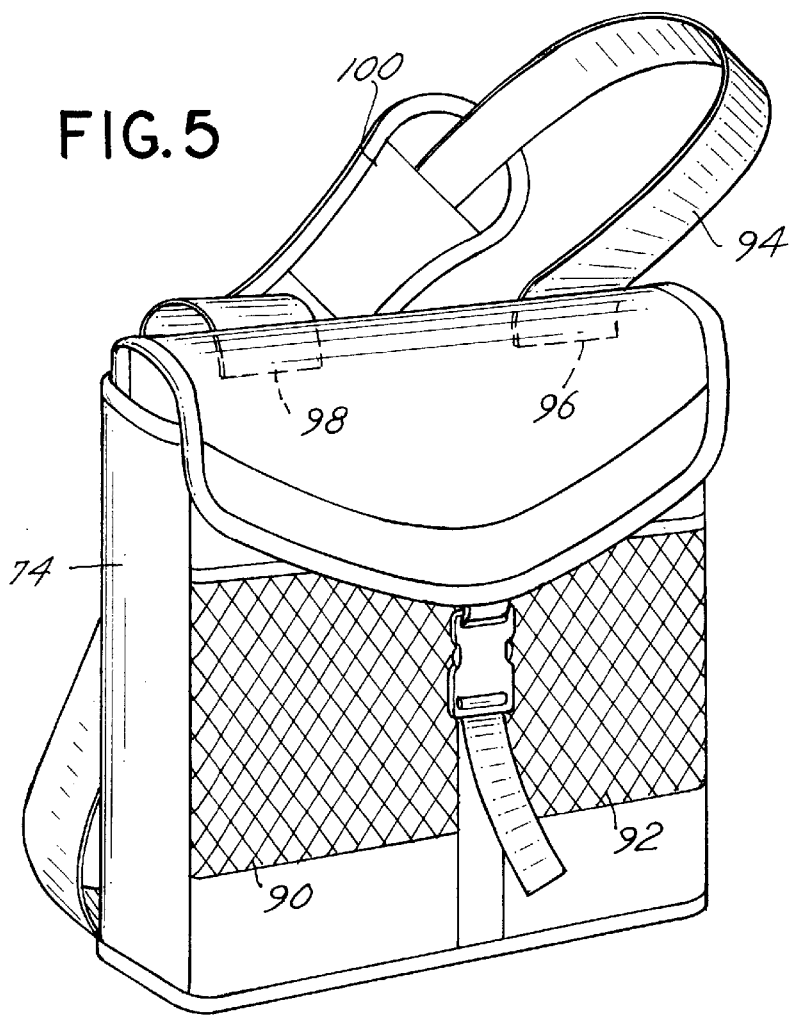
FIG. 5 is an isometric view of the carrying case of FIG. 4 wherein the case has been fully assembled about a personal computer.
Figure 6:
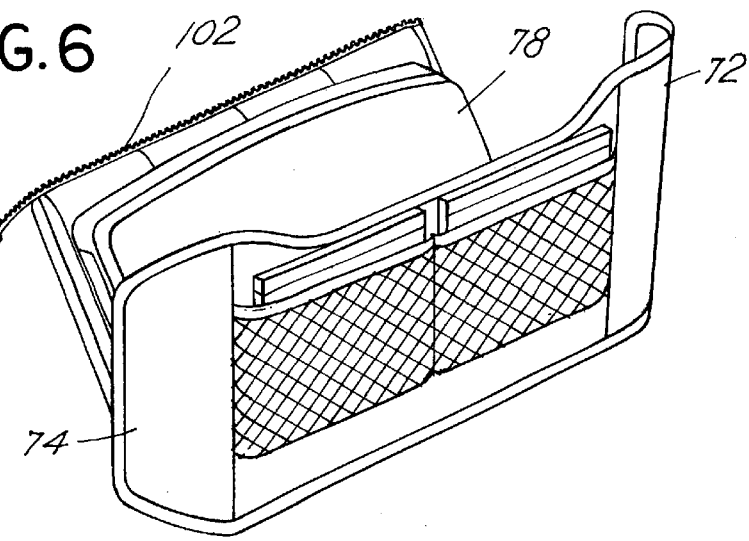
FIG. 6 depicts in an isometric view the carrying case of FIGS. 4 and 5 wherein the top flap thereof has been positioned for attachment of the case by means of a zipper into a larger case or business container.

FIGS. 4, 5 and 6 illustrate an alternative embodiment of the invention. The general arrangement of configuration of the separate panels is substantially the same as the embodiment of FIGS. 1–3. However, there are additional features and configurational changes that distinguish the embodiment of FIGS. 4, 5 and 6. Thus, as shown in those figures, a front panel 70 includes a first side flap 72 and a second side flap 74 which may be joined around the backside of back panel 76 so as to encapsulate or protect a personal computer 78. A flap 80 is attached to the back or rear panel 76 along a flexible or living hinge 82. The flap 80 includes a clip or fastener 84 which joins with a compatible fastener 86 mounted on a strap 88 affixed to the front panel 70. In this manner, the flap 80 may be adjustably and tightly held in position over the personal computer 78 in the manner depicted in FIG. 5. Mesh pockets 90 and 92 are provided on the outside face of the front panel 70. The inside of the front panel 70 is, of course, padded as are all the inside surfaces formed about the personal computer 78. The mesh pockets 90 and 92 thus are provided for holding paper, pens, and other items such as computer disks and the like.

As depicted in FIG. 5, a shoulder strap 94 is attached to the back side panel 76 on the outside thereof at attachment or connection points 96 and 98 as shown in phantom in FIG. 5. Thus, the strap 94 which includes a shoulder pad 100 enables ease of transport of the carrying case.

As shown in FIG. 6, the carrying case of the embodiment of FIGS. 4 and 5 may optionally include a zipper attachment 102 which cooperates with or may be attached to a compatible zipper within a larger case, briefcase, luggage, or the like.

With the case as described, it is possible to accommodate items of multiple sizes, shapes and thicknesses in a padded enclosure. With the back side 10 and front side 22 being semi-rigid and padded, the item 50 within the case is protected against abuse. Various fastening means other than Velcro-type fasteners may be utilized to accommodate the adjustability of the size of the pouch. The invention is, therefore, to be limited only by the following claims and equivalents thereof.

What is claimed is:

1. A personal computer carry case comprising, in combination:

a single foldable personal computer pouch comprising multiple padded, semi-rigid front side and back side sections connected by multiple flexible hinge sections, said sections including (a) a semi-rigid, padded first rectangular back side section having a lower margin, an upper margin, a first side margin and a second side margin parallel to the first side margin;

(b) a bottom flexible hinge section of flexible material attached to the back side section lower margin, said bottom flexible hinge section including a first margin coextensive with the back side section lower margin, and further including a spaced second margin parallel to and spaced from the bottom flexible hinge first margin by a distance to define a flexible hinge section capable of folding over a variety of thicknesses of an item positioned on the back side section, said bottom flexible hinge section forming an extension of the back side section from the back side section lower margin;

(c) a generally rectangular semi-rigid, padded front side section, said bottom flexible hinge section second margin connected to the generally rectangular front side section, said front side section including a top margin generally parallel to and spaced from the bottom margin of the back side section, said front side section top margin having a generally convex shape portion to facilitate access to the case in a folded condition, said front side section foldable overlying a portion of the back side section when the case is in a folded condition;

(d) said front side section further including first and second lateral side flaps which are each comprised of flexible material and foldable over the back side section along lines parallel to the side margins of the back side section to accommodate a variety of thicknesses of an item positioned on the back side section, said front side section being foldable over the back side section;

(e) a fold over top flap section attached by a flexible top hinge section comprised of flexible material to the upper margin of the back flap side section, said fold over top section including a carry handle on one side thereof at the upper margin of the back side section; and (f) fasteners incorporated in the front side section side flaps for holding the side flaps engaged with the back section to form a pouch, and fasteners incorporated in the top flap section for holding the top flap section engaged to the front side section.

2. The case of claim 1 further including a zipper attachment along the upper margin of the back side section.

3. A personal computer carry case comprising, in combination:

a single foldable personal computer pouch comprising multiple padded, semi-rigid front side and back side sections connected by multiple flexible hinge sections, said sections including (a) a semi-rigid, padded first rectangular back side section having a lower margin, an upper margin, a first side margin and a second side margin parallel to the first side margin;

(b) a bottom flexible material hinge section attached to the back side section lower margin, said bottom flexible material hinge section forming an extension of the back side section from the lower margin;

(c) a generally rectangular semi-rigid, padded-front side section, said bottom flexible material hinge section connected to the generally rectangular front side section, said front side section including a top margin generally parallel to and spaced from the bottom margin of the back side section and further including a first and a second lateral side flap, each of which is flexible and foldable over the back side section along lines parallel to the side margin of the back side section;

(d) a fold over top flap section attached by a flexible top hinge section to the upper margin of the back side section, said fold over top section including a carry handle on one side thereof at the upper margin of the back side section; and (e) fasteners incorporated in each of the front side section front and second lateral flaps for holding the said flaps engaged with the back section to form a pouch, and fasteners incorporated in the top flap section for holding the top flap section engaged to the front side section, said front side section including said a top margin having a convex shape to facilitate access to the case in the folded condition, said front side section overlying only a portion of the backside section in the folded condition.

\* \* \* \* \*